Jan. 24, 1967    C. S. LEE    3,300,186
LIFTING FRAMES FOR REINFORCING COLUMNS
Filed Aug. 13, 1964
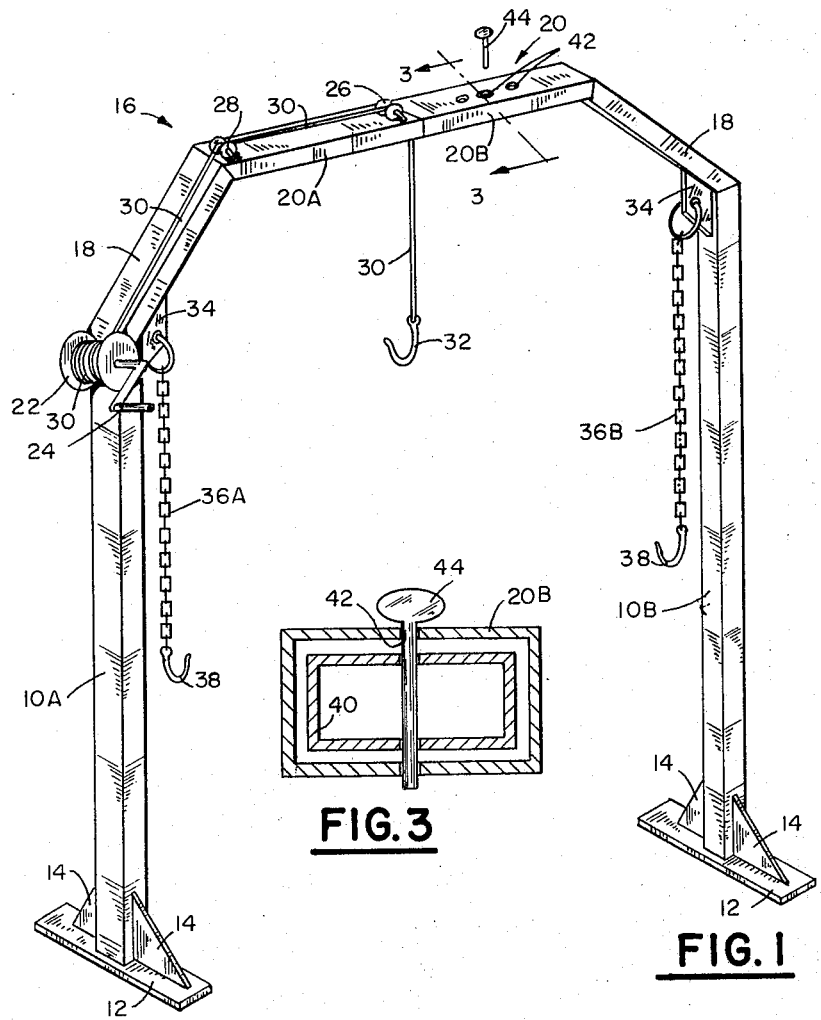
FIG. 3
FIG. 1
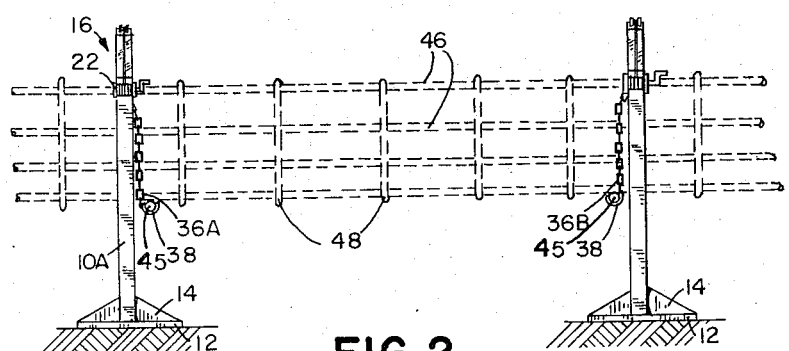
FIG. 2
INVENTOR.
CLIFFORD S. LEE
BY
Head & Johnson
ATTORNEYS United States Patent Office 3,300,186
Patented Jan. 24, 1967

3,300,186
LIFTING FRAMES FOR REINFORCING COLUMNS
Clifford S. Lee, Everman, Tex., assignor of twenty-five percent to Charley Warren, Tulsa, Okla.
Filed Aug. 13, 1964, Ser. No. 389,331
1 Claim. (Cl. 254—143)

This invention relates to a lifting frame. More particularly, the invention relates to a device for supporting the elements forming reinforcing columns during the assembly of such columns as utilized in construction work.

When any building, bridge, or such structure of any consequential size is constructed, one of the problems is providing the proper foundation. The most frequent method of constructing the foundation is to bore relatively large diameter holes in the earth to a depth where substantial solid subterranean formations are encountered. The holes are then utilized to receive reinforced concrete which extends upwardly to form a basis of supporting the building. In addition, the large columns necessary in certain building construction require reinforcing. When the columns are large the reinforcing must be fabricated so that reinforcing bars are properly spaced as the concrete is poured. The usual procedure is for iron workers to assemble reinforcing columns of a large number of bars spaced by the use of hoops or coils of smaller diameter steel bars.

One of the burdensome problems of construction work is that of the fabrication of such reinforcing columns. Large reinforcing bars may weigh from 125 to 300 pounds each, or more. Usually six or more of these large reinforcing bars are utilized to form a single reinforcing column. The column, when assembled, is then set vertically into position.

The biggest problem is holding the reinforcing bars in proper position as they are attached to the steel spiral or hoops. The most usual way of assembling the reinforcing columns is to place the steel bars upon wooden frames. The rods are then pushed and hauled into position for the hoops.

This invention provides a means of eliminating the great amount of lifting and moving of heavy reinforcing bars during the assembly of reinforcing columns.

It is a basic object of this invention to provide a lifting frame for use in assembling reinforcing columns.

Another object of this invention is to provide an improved lifting frame for assembling reinforcing columns including means whereby the manual lifting of reinforcing bars is eliminated.

Another object of this invention is to provide an improved lifting frame for use in the fabrication of reinforcing columns including means whereby the elements making up the reinforcing columns may be easily lifted into position and when the reinforcing columns are completed they may be lowered into position with a minimum of manual labor.

These and other objects and a better understanding of the invention may be had by referring to the following description and claims taken in conjunction with the attached drawings in which:

FIGURE 1 is an isometric view of a lifting frame of this invention.

FIGURE 2 is a side view, in reduced scale, of two of the lifting frames of this invention shown as utilized during the assembly of a reinforcing column.

FIGURE 3 is a cross-sectional view taken along the line 3—3 of FIGURE 1.

This invention may be described as a lifting frame for use in constructing reinforcing columns. More particularly, but not by way of limitation, the invention may be described as a lifting frame comprising a pair of spaced apart vertical legs, a base plate affixed to the lower end of each of the legs, a horizontal header member supported at each end of the legs, a winch supported to one of the legs adjacent the upper end thereof, the winch having a handle whereby the winch may be rotated, a pulley affixed to the header member intermediate the legs, a cable having the free end extending over the pulley and having the other end windably received on the winch, a hook at the free end of the pulley, a vertical hanging chain supported at the upper end to the horizontal header adjacent each of the legs, and a hook affixed to each of the chains at the lower end thereof.

Referring now to the drawings and first to FIGURE 1, the invention, in its preferred embodiment, is shown. Basically the invention provides a frame consisting of two spaced apart vertical legs 10A and 10B. Affixed to the bottom of each of the legs 10A and 10B is a base plate 12 which may be reinforced by angular gasset plates 14. The base plates 12 adapt the frame to be supported on the earth or any other working surface and help to prevent it from toppling over.

Extending across the top of the vertical legs 10A and 10B is a horizontal header generally indicated by the numeral 16. In the preferred embodiment shown the header member 16 consists of two angular risers 18 and an intermediate horizontal portion generally indicated by the numeral 20.

Rotatably supported to one of the legs 10A at the upper end thereof is a winch 22 rotated by a handle 24. Affixed to the intermediate portion 20 of header 16 is a pulley 26 and at the intersection of the angular riser 18 and portion 20 of the header is another pulley 28. A cable 30 extends over the pulleys 26 and 28 and has one end thereof windably received by the winch 22. The free end of cable 30 hangs down between the legs 10A and 10B. At the free end is a hook 32.

Affixed at the upper end of each leg 10A and 10B is a plate 34 which receives the upper end of chains 36A and 36B. At the end of each of the chains 36 is a hook 38.

In the preferred embodiment the header 16 is adjustably telescopic so that the distance between legs 10A and 10B may be varied and in addition, so that the frame may be easily broken down into two basic components for ease of transportation and storage. In this preferred embodiment the intermediate portion 20 consists of two separable portions 20A and 20B. One of the portions 20A includes permanently affixed thereto an intermediate telescoping member 40, as best shown in FIGURE 3. The other half of the intermediate portion 20B is provided with spaced openings 42 therein to receive a pin 44. By removing pin 44 the portions of the frame including legs 10A and 10B may be separated and by moving the pin 44 to various openings 42 the width between the legs may be varied.

FIGURE 2 is a side view showing the device as utilized.

Operation

When it is desired to construct a reinforcing column at least two of the frames of this invention are utilized and are spaced from each other as shown in FIGURE 2. The frames are preferably placed over a number of reinforcing rods. A chain is placed around the number of rods to be utilized in the column, for instance six or more, and are lifted to working height by means of the hook 32, cable 30 and winch 22. When at working height an iron bar 45 (which is not a part of the invention) is slipped under the rods and is supported by the hooks 38 at the ends of the chains 36A and 36B of each lifting frame. The reinforcing rods 46 are shown in dotted outline as they have been hoisted into position and secured to loops or hoops 48, also shown in dotted outline. In addition to the hoops 48, a spiraled rod may be utilized to form the reinforcing column.

In practice the hoops utilized to complete the fabrication of the reinforcing column are attached to one rod and that rod is lifted by the winches so that the next rod can be attached. The hoops welded or wired to the reinforcing hoops 46 so that the reinforcing rods are firmly and properly spaced relative to each other. When the column is complete it is easily lowered to the ground. The frames are tipped to one side and the column may then be rolled away and placed into position.

Obviously, the advantage of this invention increases with the size of the column being fabricated. Where longer columns are utilized, three, four or even more of the lifting frames may be required. It has been learned that by utilizing lifting frames of this invention an average crew of iron workers can assemble twice as many reinforcing columns per day as has previously been obtainable when utilizing the standard method of fabrication wherein the reinforcing columns are typically supported on wooden horses during assembly.

Although the invention has been described with a certain degree of particularity, it is manifest that many changes may be made in the details of construction and the arrangement of components without departing from the spirit and scope of this disclosure.

What is claimed is:

A reinforcing bar assembly lifting frame comprising:
 a pair of spaced apart vertical legs;
 a base plate affixed to the lower end of each of the legs;
 a horizontal header member supported at each end by the legs;
 a winch supported to one of the legs adjacent the upper end thereof, the winch having a handle for rotation thereof;
 a pulley affixed to the header member intermediate the legs;
 a cable having the free end extending over the pulley and having the other end windably received by the winch;
 a hook on the free end of the cable;
 a plate member affixed to the upper end of each leg, said plates extending in the plane of said header member and towards each other;
 a vertically hanging chain supported at the upper end to each of said plates, said chains being of length less than said legs; and
 a hook affixed to each chain at the lower end thereof adaptable to removably receive a reinforcing bar assembly supporting rod therebetween.

References Cited by the Examiner

UNITED STATES PATENTS

| | | | |
|---|---|---|---|
| 152,382 | 6/1874 | Kelly | 254—139 |
| 285,721 | 9/1883 | Yeaw | 254—139 |
| 458,993 | 9/1891 | Barr | 254—145 |
| 783,672 | 2/1905 | Bock | 254—145 |
| 893,678 | 7/1908 | Van Wie | 254—139 |
| 1,200,649 | 10/1916 | Quinn | 254—145 |
| 1,239,524 | 9/1917 | Root | 254—145 |
| 1,411,733 | 4/1922 | Kimball | 254—145 |
| 2,193,047 | 3/1940 | Truitt et al. | 254—139 X |
| 2,427,667 | 9/1947 | Gilbert | 254—139.1 X |
| 2,606,001 | 8/1952 | Lepper | 254—145 |
| 2,772,010 | 11/1956 | Buehring | 254—139.1 X |

FOREIGN PATENTS 630,574  8/1927  France.

SAMUEL F. COLEMAN, *Primary Examiner.*